(12) United States Patent
Knebel et al.

(10) Patent No.: US 6,740,868 B1
(45) Date of Patent: May 25, 2004

(54) SCANNING MICROSCOPE AND A METHOD OF SCANNING A SPECIMEN

(75) Inventors: Werner Knebel, Kronau (DE); Joachim Bradl, Schriesheim (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 264 days.

(21) Appl. No.: 09/681,019

(22) Filed: Nov. 28, 2000

(30) Foreign Application Priority Data

Nov. 29, 1999 (DE) .......................................... 199 57 418

(51) Int. Cl.⁷ ............................... H01J 3/14; G01J 3/30
(52) U.S. Cl. ...................... 250/234; 250/458.1; 356/317
(58) Field of Search .................... 250/206.1, 226, 250/458.1, 459.1, 461.1, 462.1, 234; 356/317, 318, 417

(56) References Cited

U.S. PATENT DOCUMENTS

| | | | |
|---|---|---|---|
| 4,330,208 A | * 5/1982 | Eloy | 356/318 |
| 4,412,246 A | 10/1983 | Allen et al. | 358/107 |
| 4,727,381 A | * 2/1988 | Bille et al. | 247/234 |
| 4,732,473 A | * 3/1988 | Bille et al. | 356/237.5 |
| 5,214,282 A | * 5/1993 | Yamaguchi et al. | 250/307 |
| 5,446,538 A | * 8/1995 | Noll | 356/318 |
| 5,481,360 A | * 1/1996 | Fujita | 356/489 |
| 5,825,020 A | * 10/1998 | Hansma et al. | 250/216 |
| 5,991,044 A | * 11/1999 | Zhang et al. | 356/417 |
| 2002/0041375 A1 | * 4/2002 | Jensen et al. | 356/318 |

* cited by examiner

*Primary Examiner*—Stephone B. Allen
(74) *Attorney, Agent, or Firm*—Houston Eliseeva LLP

(57) ABSTRACT

A method and a scanning microscope for application of the method for optical-light scanning of a specimen; preferably in scanning microscopy, in particular in confocal laser scanning microscopy, the intensity of the light being regulated, is characterized, in order to optimize signal yield already during the actual data recording or measurement, in that regulation is accomplished as a function of the current focus position in the specimen region of the scanned, focused light beam.

36 Claims, 2 Drawing Sheets

SCANNING MICROSCOPE AND A METHOD OF SCANNING A SPECIMEN

CROSS REFERENCE TO RELATED APPLICATIONS

This invention claims priority of a German patent application DE-199 57 418.9 which is incorporated by reference herein.

BACKGROUND OF INVENTION

The present invention refers to a method for optical-light scanning of a specimen, preferably in scanning microscopy, in particular in confocal laser scanning microscopy, the intensity of the light being regulated. The invention furthermore concerns a scanning microscope for scanning a specimen whereby light intensity regulation is applied. Methods of the generic type are used in a number of fields, light intensity regulation serving principally to make available a light source having a constant light intensity regardless of time. A constant light intensity is a prerequisite for quantitative investigations.

In the presence of a low signal-to-noise ratio, in particular in confocal fluorescent laser scanning microscopy, the "auto-gain" method is utilized. Purely by way of example, reference is made to U.S. Pat. No. 4,412,246, which describes, per se, a method for adapting a polarization or interference video microscope system using an auto-gain method. In the auto-gain method the gain of the detectors, for example of photomultipliers, is adapted, during data recording or during optical-light scanning of a specimen, to the dynamic range of the measured signals that is actually present, so that with a constant illumination intensity, the available image information is then almost ideal.

Also possible is subsequent computer-controlled reconstruction of the measured data, modeled on the auto-gain method.

The auto-gain method and computer-controlled reconstruction provide only a visual impression of a better image. The information content of the measurement, and the signal-to-noise ratio on which the measurement is based, are not thereby improved, since the measured signal itself is not influenced. In particular, noise is also amplified. If the signal-to-noise ratio of the measurement is too low, artifacts can be simulated or the measurement result can be entirely unusable.

SUMMERY OF INVENTION

It is therefore the object of the present invention to configure and develop a method of the generic type that optimizes the signal yield already during data recording or measurement.

The above object is achieve by a method which comprises the steps of: providing a focused light beam, scanning the focused light beam across a specimen region thereby defining a current focus position; and regulating the Intensity of the light beam, by determining a function of the current focus position in the specimen region of the scanned, focused light beam.

Another object of the present invention is to describe a scanning microscope for optimizing the signal yield already during the actual data recording or measurement.

The aforesaid object is achieved by a scanning microscope comprising: a light source generating a focused light beam, means for scanning the focused light beam across a specimen region thereby defining a current focus position, and means for regulating the intensity of the light beam, by determining a function of the current focus position in the specimen region of the scanned, focused light beam.

What has been recognized according to the present invention is first of all that an improvement in signal yield in optical-light scanning methods can be achieved by adapting or regulating the intensity of the light being used. If the adaptation or regulation then also occurs as a function of the current scanning location or current focus position, the signal yield can in fact be optimized. This procedure according to the present invention is highly advantageous in particular when the measured signal of the optical-light scan has too low a signal-to-noise ratio. Regulation of the light intensity causes the specimen being scanned to be impinged upon by more or less light; the scattered, reflected, or fluorescent light to be detected can thus be correspondingly increased or reduced in intensity at least within a certain range. Light intensity regulation ultimately makes it possible to achieve regulation or adaptation of the detected light to the dynamic range of the detector being used.

Concretely, light intensity regulation could be accomplished as a function of the current axial focus position. This is advantageous in particular when an at least partially transparent three-dimensional specimen is being optically scanned, and when at least partial absorption of the illuminating light occurs as a function of the axial focus position of the scanning beam in the three-dimensional specimen. The deeper the penetration of the light beam into the specimen, i.e. the deeper the current focus position, the greater the corresponding need to increase the light intensity.

Light intensity regulation as a function of the current lateral focus position would also be conceivable. This is advantageous in particular when individual specimen regions absorb the illuminating light more strongly than the remaining specimen regions. In this case the light intensity could be increased specifically when the scanned optical-light beam is located in such a strongly-absorbing lateral scanning position.

The focus position or positions is/are definable by the user. Ultimately the user defines the axial and/or lateral two- or three-dimensional region of the specimen that is scanned with optical light. Definition of the specimen region to be scanned could be accomplished automatically or interactively. In the latter case, the user could input the region into the control or regulation unit of the corresponding optical-light scanning unit.

In an alternative embodiment, intensity regulation is accomplished in accordance with an analytical formula. The analytical formula could be an operation combining the local coordinates of the current focus position of the scanning beam in the specimen with the current light intensity value that is to be established or regulated. The scanning rate of the optical-light beam could also be incorporated into the analytical formula. The light intensity regulation is accomplished for example in accordance with the Lambert-Beer law. Furthermore, the light intensity regulation is accomplished using an auto-gain method. In order to maintain a proper light intensity regulation a combination of the analytical formula, the Lambert-Beer law and the auto-gain method is useful as well.

If the total absorption of the specimen being observed is negligible or low, i.e. if the specimen has an absorption of no more than 10%, light intensity regulation could be accomplished in accordance with the Lambert-Beer law. This regulation variant is preferably suitable for a light intensity adaptation context in which win different axial focus positions of corresponding three-dimensional specimens are scanned with optical light, since absorption losses of illuminating light in the specimen can thereby be compensated for.

In a concrete embodiment, light intensity regulation is accomplished using an auto-gain method, in which the light intensity is adapted to the measured dynamic range of the measured values.

A combination of the regulation possibilities so far described is also possible. For example, light intensity regulation in terms of the current axial focus position could be accomplished in accordance with the Lambert-Beer law, and in terms of the current lateral focus position could be based on an analytical formula; or light intensity regulation could be accomplished entirely with an auto-gain method.

The refractive index of the specimen's mounting medium or the refractive index of the specimen itself could be taken into account in light intensity regulation. It is also conceivable to take into account refractive index transitions, for example from the cover slip to the specimen medium.

In a concrete embodiment, light intensity regulation is accomplished in conjunction with an expert system implemented in the scanning microscope control computer. This expert system takes into account the properties of the specimen itself, the properties of any mounting or specimen medium, the physical boundary conditions, the measurement arrangement, and any upper limit on the maximum light intensity that may be applied to the specimen. This light intensity regulation system could also be interactively influenced by the user.

Advantageously, the information concerning light intensity regulation during data recording is taken into account in data visualization. For example, each detected image point has assigned to it, in addition to its intensity value and local coordinates, the illumination intensity value on which its measurement is based. Data visualization could be accomplished either simultaneously or after the data recording. Simultaneous data visualization could be accomplished, for example, with the control computer of the scanning microscope. It is very particularly advantageous to take into account the information regarding light intensity regulation during data recording for a computer restoration method or a digital reconstruction method. These restoration or reconstruction methods are generally based on a constant illumination intensity, which is not present in the case of this method according to the present invention. These restoration or reconstruction methods could, however, be used accordingly if the information concerning light intensity regulation during data recording were taken into account.

In a further embodiment, light intensity regulation is accomplished with an active optical element arranged in the beam path of the scanning microscope. This is advantageous in particular because an active optical element of this kind allows rapid, reproducible, and accurate light intensity regulation. An acousto-optical modulator CAOM), for example, could be used as the active optical element. It is also conceivable to use an acousto-optical tunable filter (AOTF) or acousto-optical deflector (AOD).

As an alternative to this, light intensity regulation could be accomplished with a passive optical element arranged in the beam path of the scanning microscope. This passive optical element could be, for example, a rotating neutral density filter disk having differing azimuthal transmission values. Light intensity regulation could also be implemented using the light source itself or its control unit.

Activation of the active or passive optical element arranged in the beam path of the scanning microscope, or of the light source itself, could be accomplished by way of the control computer of the scanning microscope. Since the control computer usually controls or regulates the scanning of the specimen and therefore knows the current lateral or axial focus position, direct and rapid activation or synchronization of the light intensity regulation system using the control computer is particularly useful and advantageous.

In an alternative embodiment, the transmission detection apparatus of the scanning microscope is adapted, as a function of the current focus position in the specimen region of the scanned, focused light beam, in such a way that a maximum signal yield is detectable with the transmission detection apparatus. This adaptation can be performed either in addition to the light intensity regulation or independently thereof.

This adaptation could be accomplished as a function of the current axial focus position of the scanned, focused light beam. The lens system of the transmission detection apparatus could be positioned in the axial direction in order to adapt the transmission detection apparatus to the current axial focus position. This ultimately can ensure that all detected beams that are acquired by the numerical aperture of the lens system of the transmission detection apparatus are also imaged on the transmission detector and detected by it. Alternatively, a change could also be made in the magnification of the lens system of the transmission detection apparatus.

Adaptation of the transmission detector of the transmission detection apparatus as a function of the current axial focus position is also conceivable. In particular, adaptation could be accomplished by positioning the transmission detector in the axial direction. A combination of adapting the lens system and the transmission detector can also advantageously maximize the signal yield of the transmission detection apparatus.

Also described is a scanning microscope for achieving the object cited initially, in which the method according to the present invention and its developments are utilized.

The scanning microscope according to the present invention is used to excite and detect fluorescing specimens that can be excited with a one-, two-, or multi-photon excitation process. With two- or multi-photon excitation processes in particular, it is possible to scan and detect specimen regions that are more distant from the cover slip/specimen medium transition, in other words are located deeper in the specimen. Since the proportion of exciting light scattered in the specimen region increases with increasing distance from the cover slip/specimen medium transition, two- or multi-photon fluorescence excitation is no longer optimal, and yields only a low fluorescent signal.

A scanning microscope for application of the method according to the present invention is therefore capable of making available, as a function of the cover slip/specimen medium transition, sufficient light intensity for an efficient two- or multi-photon excitation process. Because of the intensity dependence of the two- or multi-photon excitation process, fluorescent excitation occurs only in the focal volume of the scanning microscope. Specimen regions above and below the present focus position are not excited to fluoresce. In addition, therefore, no bleaching of the fluorescent dye occurs for the regions outside the focus position.

BRIEF DESCRIPTION OF DRAWINGS

There are various ways of advantageously embodying and developing the teaching of the present invention. Reference is made, for that purpose, on the one hand to the dependent claims which follow the independent method claim as well as the independent claim for a scanning microscope, and on the other hand to the explanation below of exemplary embodiments of the invention with reference to the drawings. In conjunction with the explanation of the preferred exemplary embodiments of the invention with reference to the drawings, a general explanation is also given of preferred embodiments and developments of the teaching. In the drawings:

DETAILED DESCRIPTION

Figure 1:
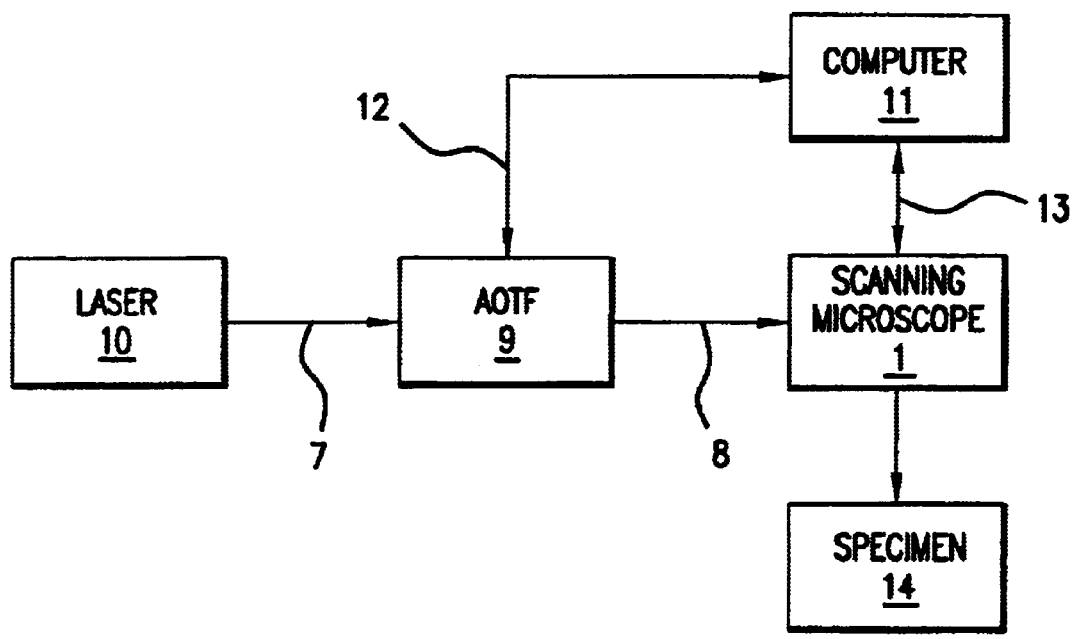
FIG. 1 shows, in a schematic depiction, a block diagram of a first exemplary embodiment of a scanning microscope according to the present invention.
Figure 2:
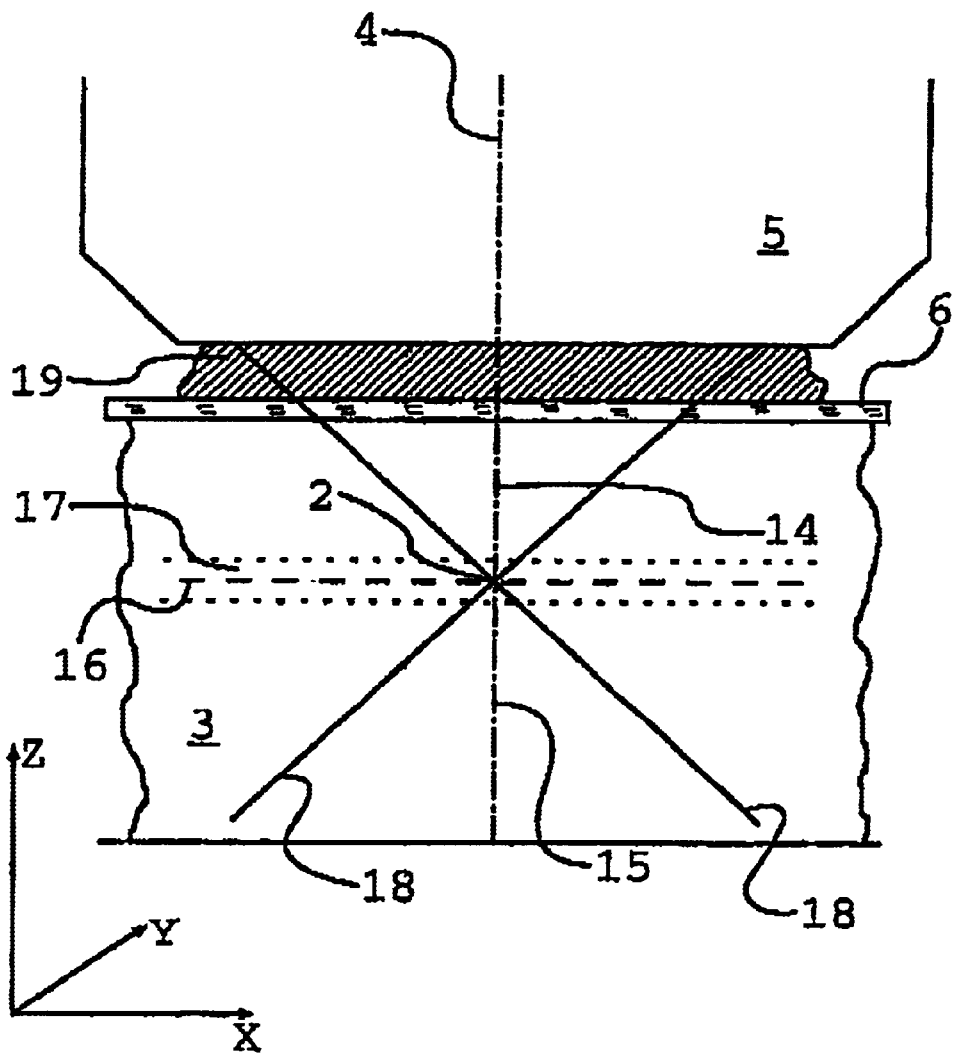
FIG. 2 shows, in a schematic diagram, an X-Z section of the specimen region of a scanning microscope according to the present invention.

FIG. 1 shows a block diagram of a scanning microscope 1 for two-photon excitation of fluorescent specimens.

According to the present invention, the method for optical-light scanning of a specimen is used in scanning microscope 1. In this context, light intensity regulation is performed as a function of the current focus position 2 in specimen region 3 of the scanned, focused light beam. Light intensity regulation is accomplished as a function of the current axial focus position in direction Z. The specimen region to be imaged is defined by the user prior to the actual data recording. The region can extend along optical axis 4 of microscope objective 5 from the transition from cover slip 6 to specimen region 3 up to the maximum working distance of microscope objective 5. In general, the region of interest to the user will extend, with reference to focal plane 16 of microscope objective 5, in the Z direction from a region 14 above focal plane 16 to a region 15 below focal plane 16. Regulation of the intensity of the exciting light is accomplished, in this context, in accordance with an analytical formula; specifically, the light intensity rises linearly with the distance between the axial focus position and the transition between cover slip 6 and specimen medium 3. The refractive index of immersion medium 19 and of the embedding medium or specimen region 3 is also taken into account in terms of regulation. If only a single image plane in the X-Y (lateral) direction is to be imaged, the imaged region extends in the Z direction over depth of field range 17 of microscope objective 5.

It is evident from FIG. 1 that the actual regulation of light intensity is accomplished with an active optical element 9 arranged in beam path 7, 8 of scanning microscope 1. Active optical element 9 is embodied as an acousto-optical tunable filter (AOTF), and is capable of regulating laser light 7 emitted by laser 10 in terms of its intensity. The regulation range of active optical element 9 extends from 100% to 0%, i.e. light 8 passing through AOTF 9 either has the same intensity as light 7 emitted by laser 10 (100%, or has an intensity value of 0. Any value in between can also be established using AOTF 9.

AOTF 9 is activated by control computer 11 via a corresponding connection 12. Control computer 11 controls and regulates the scanning operation of scanning microscope 1 via connection 13. Control computer 11 therefore knows the present focus position 2 of the focused, scanned laser beam 8 and can activate AOTF 9, via a line 12, at a sufficient speed.

FIG. 1 shows, in purely schematic fashion, transmission detection apparatus 13 of scanning microscope 1. This is a so-called "non-descanned detector," in which the fluorescent light is not transformed by a scanning mirror into a stationary light beam which is then detected via a detection pinhole with a downstream photomultiplier, but rather the fluorescent light is detected directly in transmission mode. Since the fluorescent light beam is not stationary, a planar detector with no detection pinhole is used.

Concretely, the detection signal of transmission detection apparatus 13 is maximized by the fact that the current position of the transmission detector is adapted to the current focus position 2 of exciting light 8, by the fact that positioning of the transmission detector in the axial direction is accomplished. The fluorescent light from the current focus position 2 is thus imaged onto the transmission detector. The entire numerical aperture of the transmission lens, which is indicated by the outer detected rays 18, is utilized in this context.

In conclusion, be it noted very particularly that the exemplary embodiments set forth above serve merely to describe the teaching claimed, but do not limit it to the exemplary embodiments.

What is claimed is:

1. A method for optical-light scanning of a specimen, the method comprising:
   providing a scanning microscope with an acousto-optical element
   providing a focused light beam, wherein the focused light beam defines a beam path characterized by a light beam intensity,
   scanning across a specimen region with the focused light beam to define a current focus position; and
   using the acousto-optical element disposed along the beam path to regulate the light beam intensity by determining a function of the current focus position of the focused light beam in the specimen region.

2. The method as defined in claim 1, wherein using the optical element comprises determining the function of a current axial focus position.

3. The method as defined in claim 1, wherein using the acousto-optical element comprises determining the function of a current lateral focus position.

4. The method as defined in claim 1, wherein the current focus position is defined by a user.

5. The method as defined in claim 1, further comprising mounting the specimen on a mounting medium, the mounting medium defining a refractive index, wherein using the acousto-optical element comprises determining the function of the refractive index.

6. The method as defined in claim 1, wherein the acousto-optical element is an acousto-optical modulator (AOM), an acousto-optical tunable filter (AOTF) or an acousto-optical deflector (AOD).

7. The method as defined in claim 1, wherein the focused light beam is generated by a light source and wherein using the acousto-optical element to regulate the light beam intensity comprises varying the intensity of the light source.

8. The method as defined in claim 1, wherein using the acousto-optical element disposed along the beam path to regulate the light beam intensity by determining a function of the current focus position further comprises utilizing an expert system implemented in a control computer of the scanning microscope in conjunction with the optical element.

9. The method as defined in claim 8, wherein the control computer controls the acousto-optical element and a light source.

10. The method as defined in claim 1, further comprising:
recording data; and
visualizing the data based on the information about the light beam intensity at the step of recording.

11. The method as defined in claim 10, further comprising implementing a computer restoration method or a digital reconstruction method by using the information about the light beam intensity at the recording step.

12. The method of claim 1, further comprising;
providing a transmission detection apparatus coupled with the scanning microscope using the transmission detection apparatus to detect a maximum signal yield as a function of the current focus position in the specimen region.

13. The method as defined in claim 12, wherein the transmission detection apparatus comprises a lens system responsive to a function of a current axial focus position.

14. The method as defined in claim 13, wherein the lens system is disposed in an axial direction.

15. The method of claim 13, further comprising the lens system having a magnification and being responsive to the function by changing the magnification.

16. The method of claim 13, further comprising a transmission detector coupled to the transmission detection apparatus and responsive to a function of the current focus position.

17. The method of claim 16, wherein the transmission detector is responsive to the function of the current focus position by being positioned in an axial direction.

18. A scanning microscope for scanning a specimen comprising:
a light source for generating a focused light beam defining a beam path of a light beam intensity;
means for scanning across a specimen region with the focused light beam to define a current focus position, and
an acousto-optical element disposed along the beam path for regulating the light beam intensity, by determining a function of the current focus position in the specimen region of the focused light beam.

19. The scanning microscope as defined in claim 18, wherein the acousto-optical element for regulating the light beam intensity further comprises means for regulating the light beam intensity of the focused light beam as a function of a current axial focus position.

20. The scanning microscope as defined in claim 18, wherein the acousto-optical element for regulating the light beam intensity further comprises means for regulating the light beam intensity of the focused light beam as a function of a current lateral focus position.

21. The scanning microscope as defined in claim 18, further comprising means for defining focus positions in the specimen region by a user.

22. The scanning microscope as defined in claim 18, further comprising a control computer, with an expert system to regulate the light beam intensity.

23. The scanning microscope as defined in claim 18, further comprising means for recording and visualizing data in response to regulation of the light beam intensity during the recording of the data.

24. The scanning microscope as defined in claim 18, wherein the light beam intensity is regulated by regulating the intensity of the light source.

25. The scanning microscope as defined in claim 18, wherein the light source and the acousto-optical element for regulating the light beam intensity is operated by a control computer.

26. The scanning microscope as defined in claim 18, wherein the specimen to be scanned is excited using a one-photon excitation process.

27. The scanning microscope as defined in claim 18, wherein the specimen to be scanned is excited using a two-photon excitation process.

28. The scanning microscope as defined in claim 18, wherein the specimen to be scanned is excited using a multi-photon excitation.

29. The scanning microscope as defined in claim 18, wherein the acousto-optical element for regulating the light beam intensity is an active optical element.

30. The scanning microscope as defined in claim 29, wherein the acousto-optical element is an acousto-optical modulator (AOM), an acousto-optical tunable filter (AOTF) or an acousto-optical deflector (AOD).

31. The scanning microscope as defined in claim 18, further comprising a transmission detection apparatus adapted in a manner responsive to the current focus position to receive a signal yield.

32. The scanning microscope as defined in claim 31, wherein the transmission detection apparatus comprises a lens system responsive to a current axial focus position.

33. The scanning microscope as defined in claim 32, wherein the lens system is responsive to the current axial focus position by positioning the lens system in an axial direction.

34. The scanning microscope as defined in claim 32, wherein the lens system is characterized by a magnification and is responsive to the function by changing the magnification.

35. The scanning microscope as defined claim 32, wherein the transmission detection apparatus comprises a transmission detector responsive to the current focus position.

36. The scanning microscope as defined in claim 35, wherein the transmission detector is positioned in an axial direction.

* * * * *